United States Patent Office 3,816,505
Patented June 11, 1974

3,816,505
PREPARATION OF HALOGENATED
DICYANOBENZENES
Lewis William Watts, Jr., Austin, Tex., assignor to
Jefferson Chemical Company, Inc., Houston, Tex.
No Drawing. Continuation-in-part of abandoned application Ser. No. 38,574, May 18, 1970. This application Oct. 19, 1972, Ser. No. 299,163
Int. Cl. C07c 121/54, 121/56, 121/58
U.S. Cl. 260—454 G                                4 Claims

ABSTRACT OF THE DISCLOSURE

A process for preparing halogenated derivatives of dicyanobenzenes by a direct vapor phase reaction of a halogen and a dicyanobenzene in an open tube. Halogenated dicyanobenzenes are reported in Horst Scheuermann's U.S. Pat. 3,290,353 (1966) and Robert D. Battershell's U.S. Pat. 3,331,735 (1967) to be useful as fungicides, bactericides and nematocides.

CROSS-REFERENCE TO RELATED APPLICATIONS

This application is a continuation-in-part of U.S. patent application Ser. No. 38,574, filed May 18, 1970, entitled Preparation of Halogenated Dicyanobenzenes, now abandoned.

This application of Lewis W. Watts and Philip H. Moss, which has issued as U.S. Pat. 3,699,677 (Nov. 17, 1972), refers to the direct vapor phase reaction of aromatic compounds, for example biphenyl with halogens. The application of Lewis W. Watts, Philip H. Moss and Ernest L. Yeakey, Ser. No. 38,478, filed of even date refers to the direct vapor phase reaction of benzonitrile with halogens.

BACKGROUND OF THE INVENTION

Field of the invention

The invention pertains to the field of synthesizing halogenated dicyanobenzenes.

Description of the prior art

Atsushi Haga's U.S. Pat. 3,108,130 (1963) teaches the catalytic chlorination of phthalonitrile at reaction temperatures of less than 500° C. The crude tetrachlorophthalonitrile obtained was of moderate purity, viz., less than 96%. The high temperature, vapor phase process of our invention is an improvement over this prior art in that no catalyst is required in our process and only a simple, heated reactor tube is used; thus, complicated purification procedures are not required and both yields and conversions are extremely high. The crude reaction product of our invention is extremely pure and under proper reaction conditions, the purity of dicyanobenzenes in our process is greater than 99%. It was surprising that isophthalonitrile did not decompose at the high temperature used in our reaction.

SUMMARY OF THE INVENTION

The invention is a process for halogenating dicyanobenzenes and the partially halogenated derivatives of dicyanobenzenes by the reaction of a halogen with a dicyanobenzene in the vapor phase in an open tubular reactor heated to a temperature of from about 725° C. to about 800° C.

PREFERRED EMBODIMENTS

Dicyanobenzenes or partially halogenated dicyanobenzenes can be readily halogenated by the interaction of a halogen, particularly chlorine, at high temperature in the gas phase. A catalyst is not necessary in the process. The vapor phase, noncatalytic chlorination of dicyanobenzenes, particularly isophthalonitrile, can be conducted in such a manner that high purity tetrachloroisophthalonitrile is produced as follows:

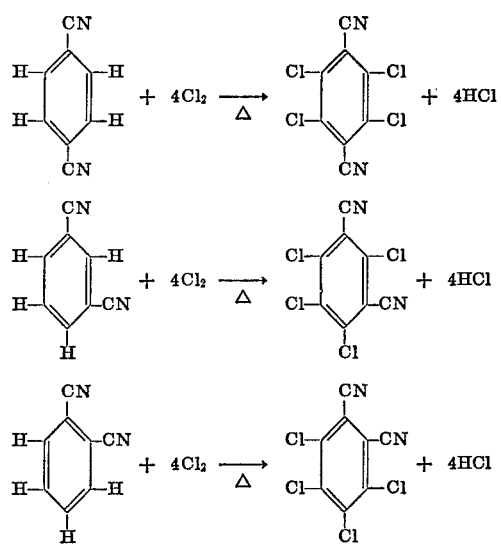

The following examples illustrate the conditions used in several vapor phase reactions between chlorine and isophthalonitrile. The reactions were carried out in a Vycor® tube (21" x 25 mm.) which was externally heated along its whole length by an electric furnace. The maximum temperature given in the examples occurred at approximately midway along the reactor tube. In all of the examples, the chlorine was pressured into the reactor and measured by rotometer. The isophthalonitrile was pumped via a Ruska Proportioning Pump into a vaporizing pot. The resulting isophthalonitrile vapor was mixed with nitrogen which was also fed into the vaporizing pot. The gaseous mixture of isophthalonitrile and nitrogen then proceeded to the reactor inlet where it came in contact with the chlorine. The chlorine, isophthalonitrile and nitrogen then proceeded to pass through the open tube reactor and the resulting halogenated product was collected in a fiberglass bag. The purity of the recovered product was measured accurately by gas-liquid chromatography. It was determined that the portion of the product which was not tetrachloroisophthalonitrile was a mixture of lower chlorinated isophthalonitrile products.

The following examples are only illustrative and are not meant to limit the scope of the invention. In the ranges used, the yield (conversion of isophthalonitrile to a chlorinated isophthalonitrile) was at or near 100%. In the examples, below, the gas volumes were calculated at standard temperature and pressure.

EXAMPLE I

A mixture of chlorine (134.4 l./hr.), an inert gas (nitrogen, 71.0 l./hr.) and isophthalonitrile (2.0 l./hr.) was passed through the inlet of a 21" x 25 mm. Vycor glass tubular reactor system which was heated to a maximum reactor temperature of 725° C. with an electric furnace. Gas chromatographic analysis of the almost colorless, crystalline product indicated the presence of 88.7% tetrachloroisophthalonitrile and 6.9% of a lower chlorinated derivative of isophthalonitrile. After one crystallization from hot toluene, the melting point of the chlorinated isophthalonitrile was 247–250° C.

EXAMPLE II

When chlorine (48.0 l./hr.), nitrogen (51.0 l./hr.) and isophthalonitrile (1.0 l./hr.) were allowed to react as in Example I, *supra*, at a maximum reactor temperature of 744° C., complete, i.e., 100% conversion of the isophthalonitrile occurred, forming pure, colorless tetrachloroisophthalonitrile. Gas chromatographic analysis of the reaction product showed a purity greater than 99.9%. The solid product showed the following analysis: Calculated for $C_8Cl_4N_2$—10.54% nitrogen, 53.33% chlorine. Found—10.53% nitrogen, 53.1% chlorine. Comparable results are obtained with the other reactants of the invention.

EXAMPLES III AND IV

The following examples are representative runs conducted under similar reaction conditions as those hereinbefore represented except the reactor temperatures in the instant runs were maintained at or near the temperatures disclosed in the prior art.

Accordingly, a gaseous mixture of chlorine, nitrogen and isophthalonitrile (molar ratio 40:40:1, volume percent basis, STP 48:51:1, respectively) were allowed to react as in Example I, *supra*, at a maximum reactor temperature of 485° C. Analysis of the select product showed only 6.5% chlorine when the calculated chlorine for tetrachloroisophthalonitrile is 53.33%.

In like manner, when the above control example was conducted using the same feed and under the same conditions except that the maximum reactor temperature was 605° C., analysis of the solid reaction product showed only 11.5% chlorine.

Any of the halogens are useful in the process of our invention but the one preferred is chlorine. The invention relates to the dicyanobenzenes: phthalonitrile, isophthalonitrile and terephthalonitrile.

A diluent material may be introduced into the reaction zone along with the vaporized halogen and vaporized dicyanobenzene. The necessary properties of the diluent are that it be inert to the reaction between the halogen and dicyanobenzene and that it be a gas or vapor at the reaction temperature. Convenient diluents are, for example, nitrogen, carobn dioxide and hydrogen chloride.

The temperature of the reaction, ratio of reactants and velocity of thruput determine the degree of halogenation and the percent conversion (yield) of the dicyanobenzene to a halogenated product. Since such a wide range of reactants and products are possible using the process of my invention, general parameters are not applicable.

At some minimum temperature above the boiling point of the dicyanobenzene and the halogen, about 400° C., the reactants will begin to react in the vapor phase and a low yield of partially halogenated dicyanobenzene will result. As the temperature is increased, the yields and degree of halogenation will increase. Further temperature increase will result in almost 100% yield of halogenated dicyanobenzene. Finally, as the temperature is raised further, the degree of halogenation reaches about 100% also. The temperature where about 100% yields and about 100% halogenation occurs ranges between about 725° C. to 800° C., the preferred temperature range of my invention. The preferred maximum temperature where about 100% yield of about 100% halogenated benzonitrile is obtained is about 750° C., but higher temperatures may be used if desired.

Holding temperature and ratio of reactants constant, the contact time may be adjusted from short to long with similar effects as increases in temperature. The same may be said of ratio of halogen to dicyanobenzene.

What is claimed is:

1. A noncatalytic process for preparing chlorinated dicyanobenzenes by reacting in a vapor phase chlorine and a dicyanobenzene or partially chlorinated derivatives of dicyanobenzenes, which comprises:

passing the chlorine in an excess molar ratio with the dicyanobenzene in an open tubular reactor heated to a temperature of from about 725° C. to about 800° C. in the absence of a catalyst.

2. A process according to claim 1 wherein chlorine is reacted with phthalonitrile, isophthalonitrile or terephthalonitrile.

3. A process according to claim 2 wherein chlorine is reacted with isophthalonitrile.

4. A process according to claim 3 wherein chlorine is reacted with isophthalonitrile to form tetrachloroisophthalonitrile.

References Cited
UNITED STATES PATENTS
3,108,130   10/1963   Haga et al. _____ 260—465

FOREIGN PATENTS
22,589   9/1968   Japan.

LEWIS GOTTS, Primary Examiner

D. H. TORRENCE, Assistant Examiner